United States Patent [19]

Chen

[11] Patent Number: 5,357,185
[45] Date of Patent: Oct. 18, 1994

[54] UNIVERSAL BATTERY CHARGER

[75] Inventor: Stephen Chen, Changhua City, Taiwan

[73] Assignee: E Lead Electronic Co., Ltd., Chuang Hua City, Taiwan

[21] Appl. No.: 32,257

[22] Filed: Mar. 17, 1993

[51] Int. Cl.[5] .............................................. H01M 10/46
[52] U.S. Cl. .............................................. 320/2; 320/15
[58] Field of Search ....................................... 320/2, 15

[56] References Cited

U.S. PATENT DOCUMENTS 5,256,954 10/1993 Chen ........................................ 320/2
5,287,052 2/1994 Wang ....................................... 320/2

Primary Examiner—R. J. Hickey
Attorney, Agent, or Firm—Browdy and Neimark

[57] ABSTRACT

A universal charger adapted for rechargeable battery packs of various size is equipped with a battery pack mounting seat having a stop flange disposed at one side thereof which is inserted in a receiving cavity of the charger case. The neighboring side of the stop flange of the mounting seat is provided with a guide track onto which is disposed an adjustment slide member having a mono-track projection disposed thereon and being able to be vertically adjusted so that a pair of sliding terminal seats each equipped with a horizontal and a vertical probe pin can be horizontally adjusted to vary the positions thereof along with the vertical adjustment of the slide member in conformance to battery of different size and structure. An abutment plate having a vertical abutment member is slidably located in a slide passage and is provided with a one end free retaining piece having a locking projection disposed thereunder which is in selective engagement with one tooth of a consecutive tooth-like restraint unit for locking the abutment plate in place whereby located battery packs of any dimension can be held in place and is electrically charged accordingly.

12 Claims, 7 Drawing Sheets

UNIVERSAL BATTERY CHARGER

BACKGROUND OF THE INVENTION

The present invention relates to a universal battery pack charger which can be adjustably adapted for battery packs of different size or dimension with ease. The present charger is equipped with a battery pack mounting seat which is inserted in a receiving cavity of a charger case and is provided with a stop flange at one side thereof and is provided with a vertically adjustable slide member confined in a slide track disposed at the neighboring side of the stop flange; onto the slide member having a mono-track projection disposed thereon is mounted a pair of sliding terminal seats on each of which is disposed a vertical and a horizontal probe pin. The position of each sliding terminal seat can be adjusted by sliding the same on the projection so as to make the present charger adapted to batteries of different size and dimension accordingly. To further hold a located battery pack in place, an abutment plate having a vertical abutment member is slidably fixed on the charger case so as to permit battery packs of different size or dimension or type to be securedly retained.

Recently portable electrical appliances have been prevalently employed everywhere, such as video cameras, walkie-talkies, wireless phones, motion phones and electrically driven model toys, each appliance is powered by a rechargeable battery pack specially designed for each purpose, resulting in different sizes or dimensions and various voltages.

To get those different battery packs recharged, an individual charger is specifically developed to comply with each respective battery pack, and no universal charger is provided to facilitate a person having a number of portable electrical appliances to get the rechargeable battery packs charged with one single charger.

A prior art charger has been developed to effect the purpose, it is particularly designed for a number of like battery packs which are closely similar in their ways of securing to a charger. This kind of charger is equipped with one or a number of common fixing mounts each of which is provided with a couple of terminals in correspondence to the input and output terminals 10 of a specific battery pack, as shown in FIG. 1 so as to make the charger adapted to battery packs of various type.

This conventional charger is complex in structure and relatively expensive and can only be applied to a few chargers available in the consumers' market. To find a way of development of a universal charger for all kinds of battery pack, the present inventor has summarized the common features of all the available battery packs given as below:

1. Each battery pack is comprised of a number of series connected unit cells; for instance, a 6 V Ni-Cd battery pack is made up of five 1.2 V Ni-Cd unit cells series connected to each other; the unit cells are packed together by a plastic cover, but each unit cell is packed in a metallic cover which can be attracted by a magnet.
2. The shape and size of each battery pack may be different from each other, but the bottom thereof is made in a plane form which can be sucked in place by a plurality of sucking disks.
3. In spite of the dimension of each battery pack being different, the pack can be secured in place by a buckle belt or by a retaining block to a plane.
4. The terminals of general battery packs are different in shape and positioned at various places, but they are generally located at the sides or the underside thereof.

Based on these common features of all the available chargers, the present inventor has designed a universal charger which can secure any battery pack in place and get the same electrically charged with ease.

SUMMARY OF THE INVENTION

The primary object of the present invention is to provide a universal battery pack charger which is adapted for all kinds of battery pack having different size, dimension or even shape.

Another object of the present invention is to provide a universal battery pack charger which is provided with a battery pack mounting seat having a buckle belt to secure a charged battery pack in place.

One further object of the present invention is to provide a universal battery pack charger which is provided with a moveable battery pack mounting seat having a magnet disposed therein which can hold a battery pack in place by magnetic attraction.

One still further object of the present invention is to provide a universal battery pack charger which is provided with a spring biased retaining block on the battery pack mounting seat for securing the mounted battery pack in place.

One still further object of the present invention is to provide a vertically adjustable slide member disposed at one side of the battery pack mounting seat and a pair of horizontally adjustable terminal seats disposed on the slide member each provided with a horizontal and a vertical probe pin thereon.

DETAILED DESCRIPTION OF THE PREFERRED EMBODIMENT

Figure 1:
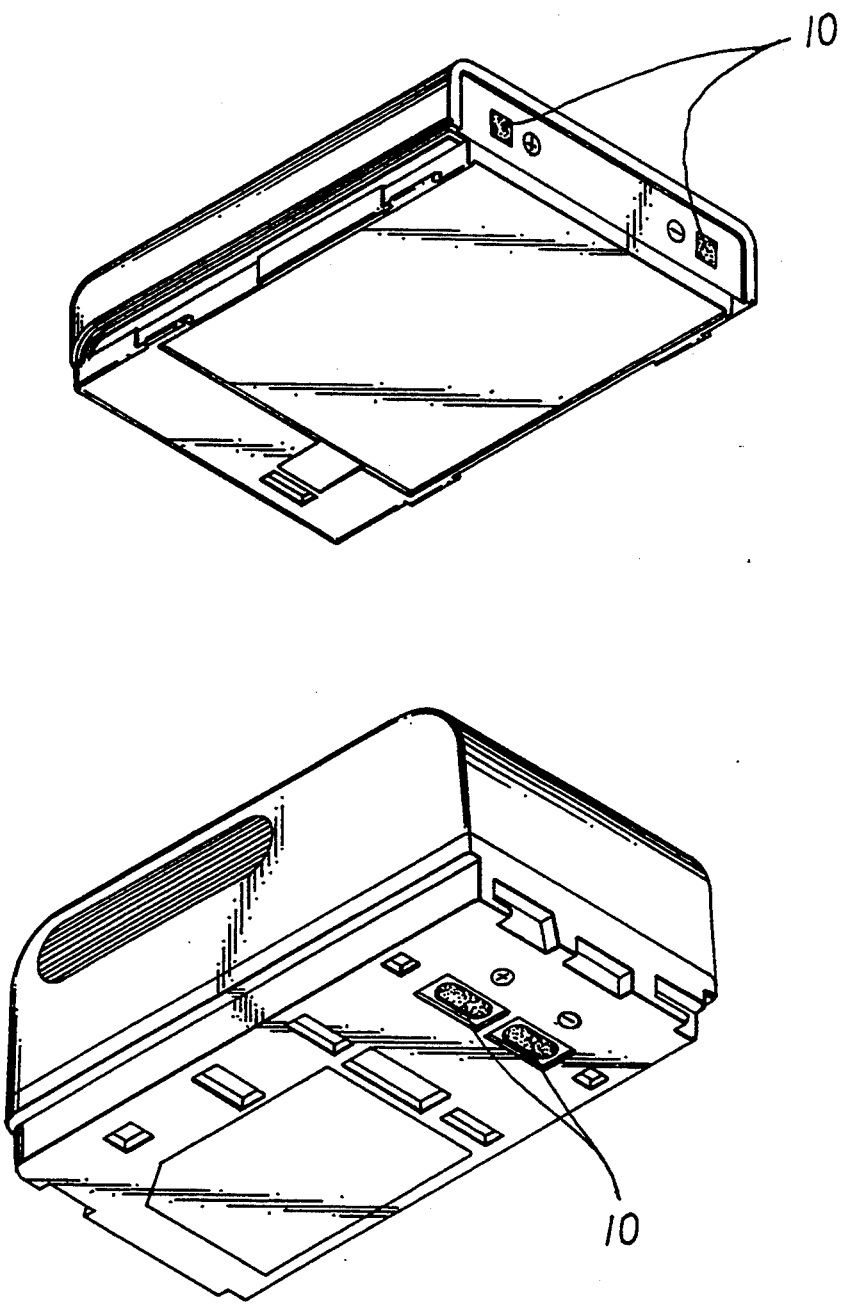
FIG. 1 is a diagram showing two different kinds of rechargeable battery packs.
Figure 2:
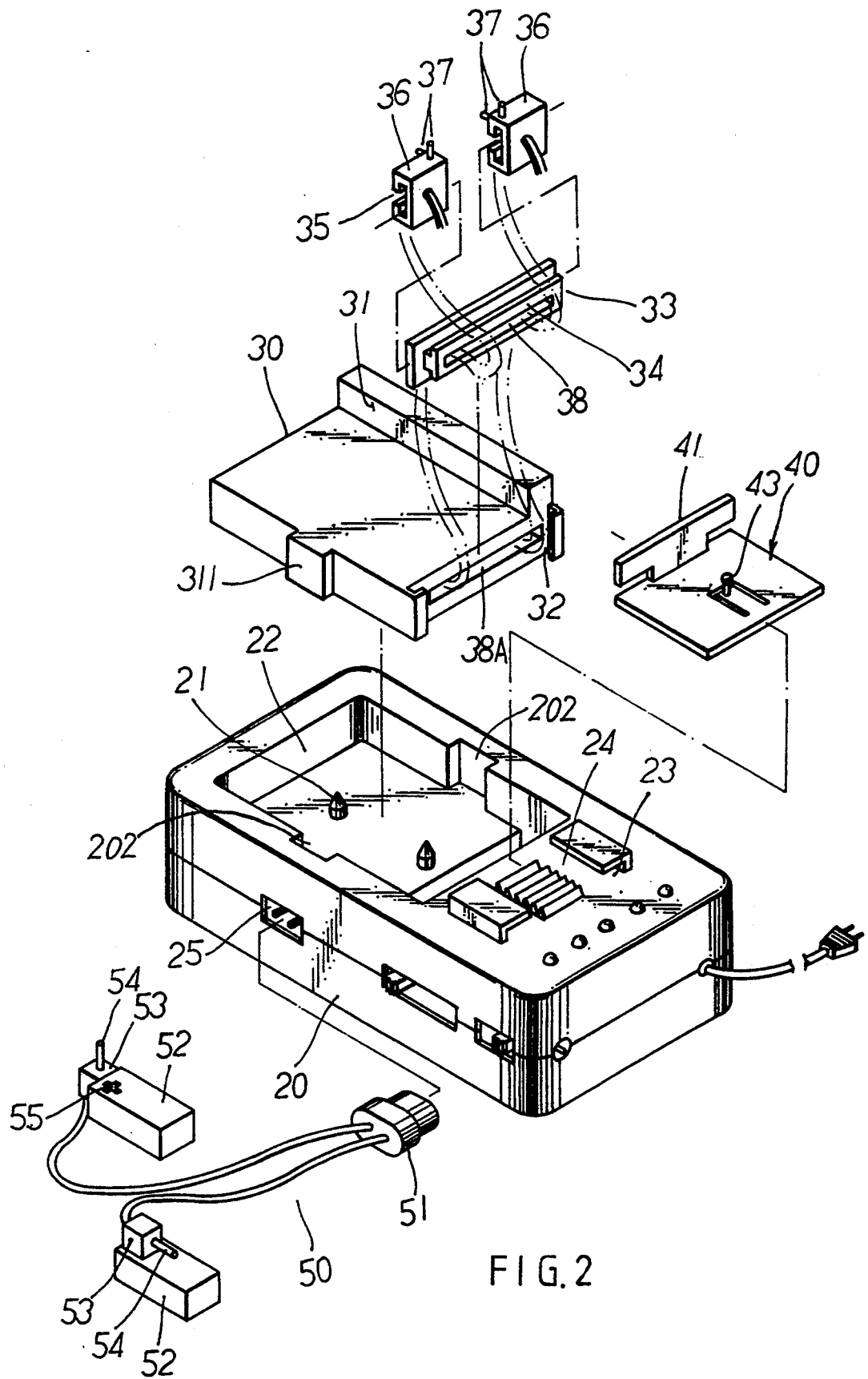
FIG. 2 is a perspective diagram showing the exploded components of the present invention.
Figure 3:
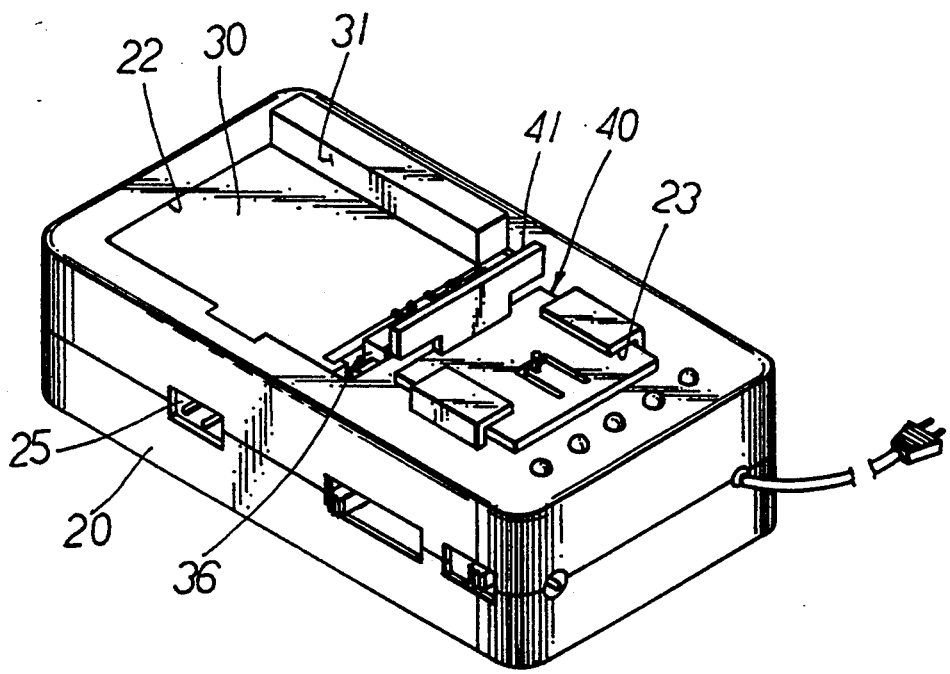
FIG. 3 is a perspective view of the present invention.

Referring to FIGS. 2, 3, the present universal battery pack charger is comprised of a charger case 20 including a receiving cavity 22 which is provided with a restraint groove 202 at each side thereof and a pair of electrically conducting protrusions 21 at the bottom thereof, a battery pack mounting seat 30 having an engagement protrusion 311 disposed at each side thereof in correspondence to the restraint groove 202 insertably housed in the receiving cavity 22. Adjacent to the receiving cavity 22 is disposed a slide passage 23 having a tooth-like restraint unit 24 disposed in the central course of the passage 23. One side of the battery charger case 20 is provided with a recessed plug-in cavity 25.

A through opening 201 disposed at the front portion of the receiving cavity 22 extends downwardly so as to permit a person to check and adjust the inserted battery pack mounting seat 30 from the bottom of the charger case 20.

Figure 2A:
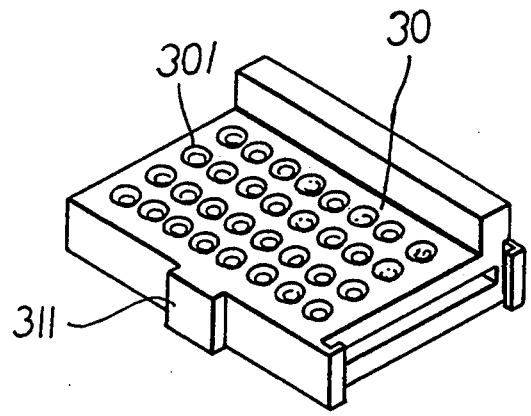
FIG. 2A is a diagram showing a battery pack mounting seat having a plurality of sucking disks disposed thereon.
Figure 2B:
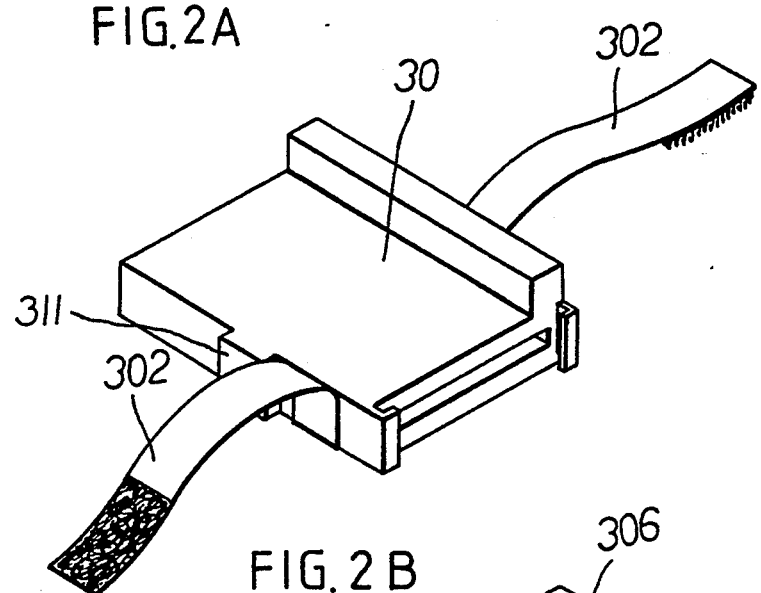
FIG. 2B is a diagram showing a battery pack mounting seat having a buckle belt associated therewith.

The battery pack mounting seat 30 can be provided with a magnet or electrically operated magnet (not shown) in the interior thereof so as to retain the charged battery packs in place by magnetism; or can be provided with a plurality of densely arranged sucking disks 301, as shown in FIG. 2A; on the surface thereof for retaining the charged batteries in position; or can be provided with a buckle belt 302 having a self-fastening unit at each loose end thereof so that the charged batteries can be buckled up in place, as shown in FIG. 2B.

Figure 2C:
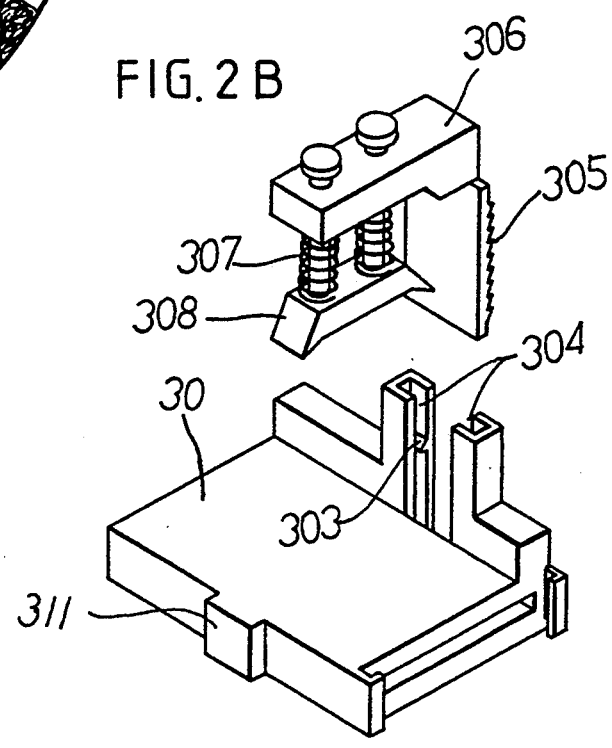
FIG. 2C is a diagram showing a battery pack mounting seat having a retaining block attached thereto.

Referring further to FIG. 2C, the battery pack mounting seat 30 is provided with a vertical adjusting trough 304 at one side thereof having stop projections 303 disposed therein so that an adjustment retaining block 306 having a plurality of consecutive engagement teeth 305 disposed thereon can be adjustably engaged with the vertical adjusting trough 304 and be retained in place by way of the stop projections 303. The retaining block 306 positioned in slidable association with a mounting seat is provided with a spring biased holding unit 308 having a number of spring elements 307 associated therewith so that the holding unit 308 can be adjustably moved up and down for holding to charged battery pack of different sizes in place.

A raised stop flange 31 is disposed at the right side of the mounting seat 30 and a guide track 32 is disposed at the neighboring side thereof so that an adjustment slide member 33 can be slidably mounted to the battery pack mounting seat 30. The adjustment slide member 33 is provided with a mono-track projection 34 onto which are mounted a pair of sliding terminal seats 36 each having a vertical and a horizontal probe pin 37 disposed at the top and front side thereof. The connection pins 37 are electrically connected. A retaining trough 35 is disposed at the front side of each sliding terminal seat 36 so as to permit the same to be slidably attached to the mono-track projection 34 of the adjustment slide member 33 whereby the adjustment slide member 33 can be adjusted vertically and horizontally. The adjustment slide member 33 is provided with an elongated slot 38 in correspondence to an elongated slot 38 A on the side of the battery retaining seat 30 so as to permit electrical wires to be led therethrough in assembly, as shown in FIG. 2.

Referring to FIG. 2, an abutment plate 40 having a vertical abutment member 41 is disposed at the front end thereof, and a one end loose retaining piece 43 having a locking projection 42 in selective engagement with one of the tooth-like restraint unit 24 is disposed at the opposite side of the vertical abutment member 41. The abutment plate 40 is slidably engaged with the slide passage 23. To make the vertical abutment member 41 move forward or backward, one has only to pull up the retaining piece 43, permitting the disengagement of the locking projection 42 with the restraint unit 24 so as to enable the forward or backward movement of the abutment plate 40 to retain a battery pack in place.

It can be clearly seen that the universal battery pack charger of the present invention can be conveniently modified to adapt to various types or brands of rechargeable battery packs. To get a rechargeable battery pack charged by the present invention, one has only to mount the same onto the mounting seat 30 without use of any special fixing means.

Figure 4:
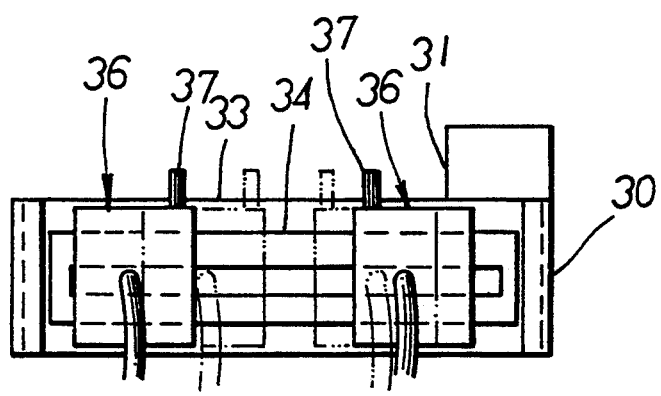
FIG. 4 is a diagram showing the adjustment of the horizontal distance of the sliding terminal seats.
Figure 5:
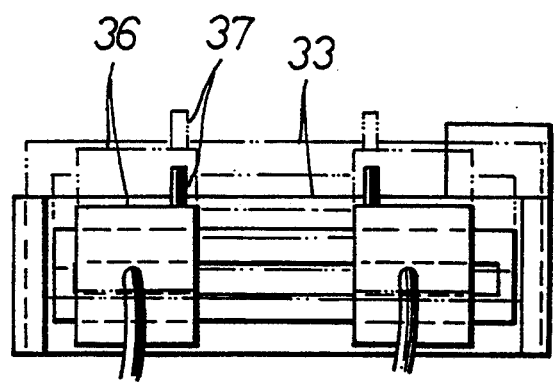
FIG. 5 is a diagram showing the vertical adjustment of the vertical position of the sliding terminal seats.
Figure 3A:
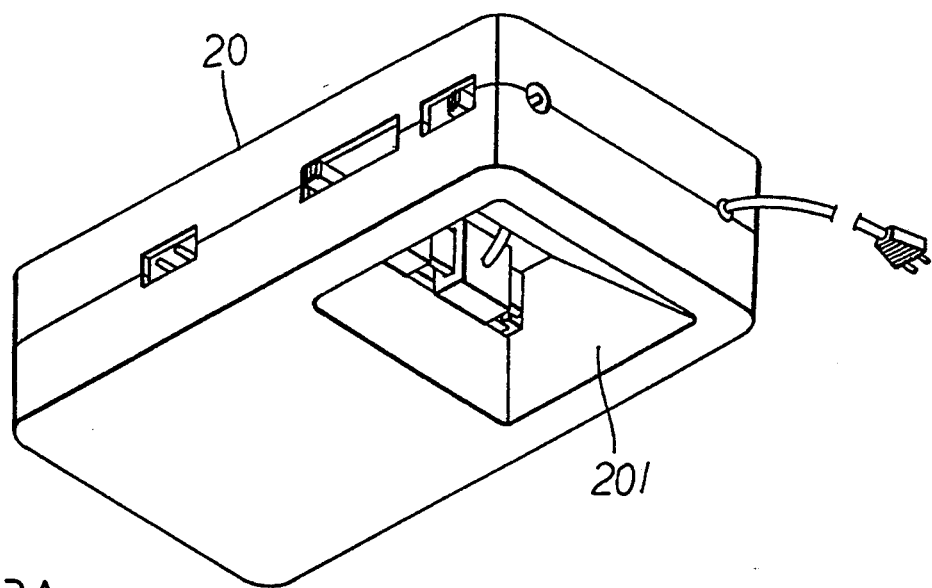
FIG. 3A is a perspective view showing the bottom thereof.
Figure 3B:
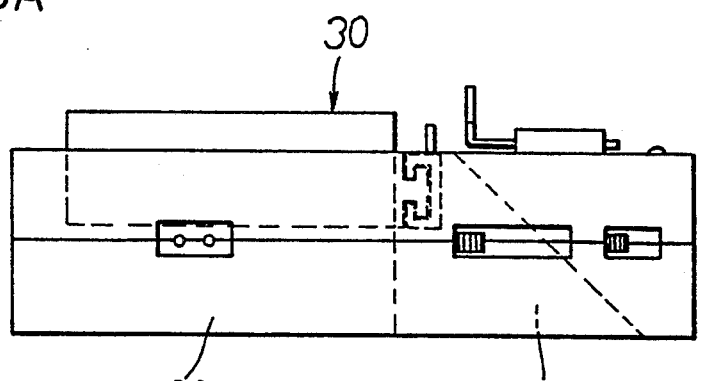
FIG. 3B is an elevational side view thereof.

Furthermore, the battery pack can be held in place by locating the same in abutment against the stop flange 31 at one side and in abutment against the vertical abutment member 41 at the neighboring side by adjustably sliding the abutment plate 40 forward or backward; and simultaneously, the adjustment slide members 33 are adjusted to move up or down with the sliding terminal seats 36 moved left or right to locate the specific battery pack on the mounting seat 30 at a proper position with the probe pins 37 electrically associated with the located battery pack, as shown in FIGS. 4 and 5. The battery pack is firmly held in position with the help of the sucking disks 301 in FIG. 2A, or the buckle belt 302 in FIG. 2B, or the adjustment retaining block 306 in FIG. 2C, or a magnet (not shown). The sliding terminal seats 36 are equipped with a negative and positive pole selection circuit so as to adapt the terminal seats 36 to the different polarity of each type of rechargeable battery; and a voltage selection circuit is provided so as to enable the present charger to be adapted to rechargeable battery packs having different voltages, facilitating the operation of the charger of the present invention.

Figure 8:
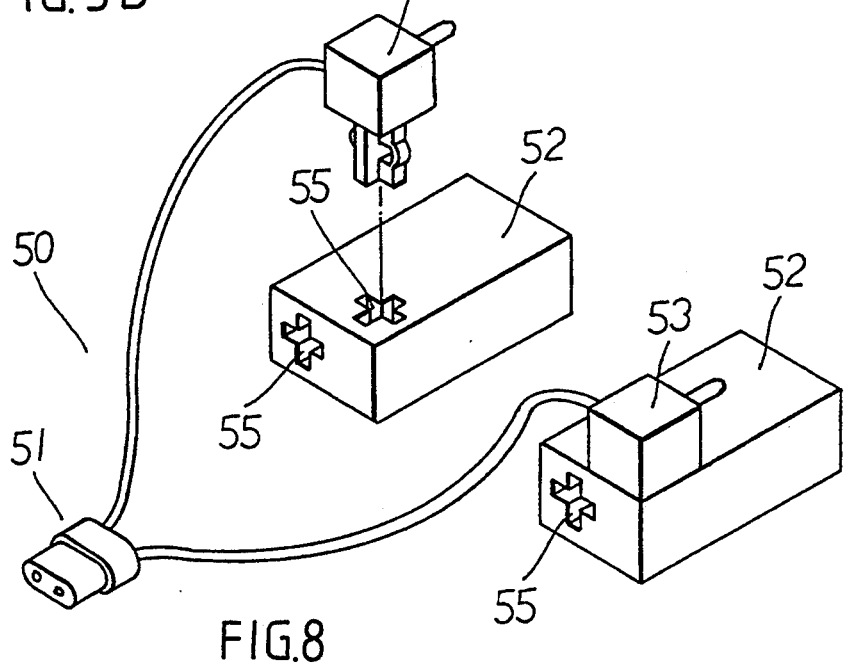
FIG. 8 is a diagram showing the independent charging means.
Figure 6:
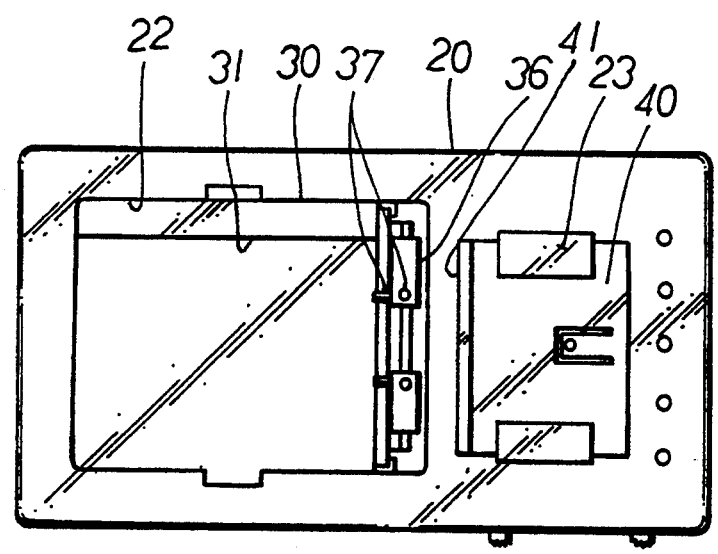
FIG. 6 is a top view thereof.
Figure 7:
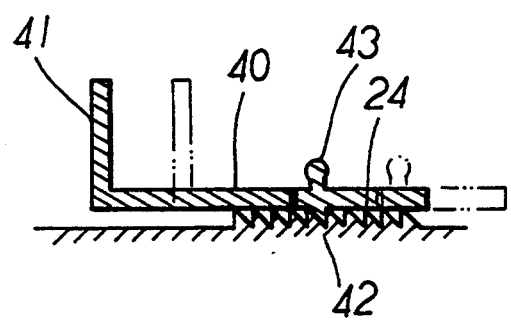
FIG. 7 is a sectional view showing the operation of the abutment plate.
Figure 9:
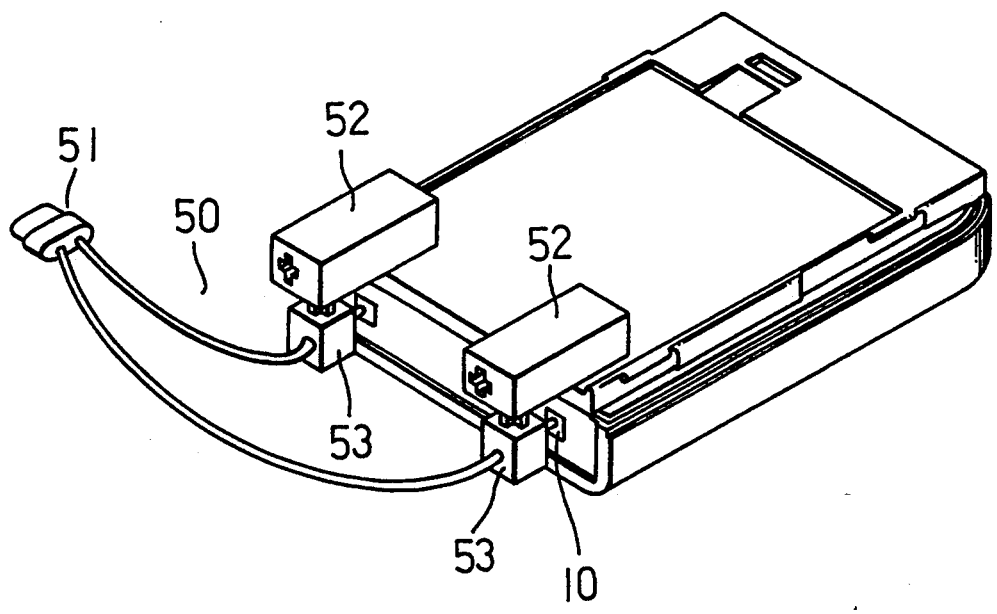
FIG. 9 is a diagram showing the application of the independent charging means to a rechargeable battery pack.

So far, the adjustable structure of the present invention can be applied to most available rechargeable battery packs; to further adapt the present charger to all kinds of irregular rechargeable battery pack, a set of independent charging means 50, as shown in FIGS. 2, and 8, is provided. The charging means is equipped with a plug 51 which is engaged with the recessed plug-in cavity 25 of the charger case 20 so as to connect the same to a charging circuit in the charger; a pair of attachment blocks 52, each provided with a sucking disk or a magnet, are attached to the surface of the charged battery, as shown in FIG. 9. At the front side and the corner of the top side is disposed a socket 55 so that a probe pin plug 53 having a probe pin 54 can be selectively engaged therewith so as to keep the probe pin in a vertical or horizontal position, adapting to different kinds of battery packs.

Figure 10:
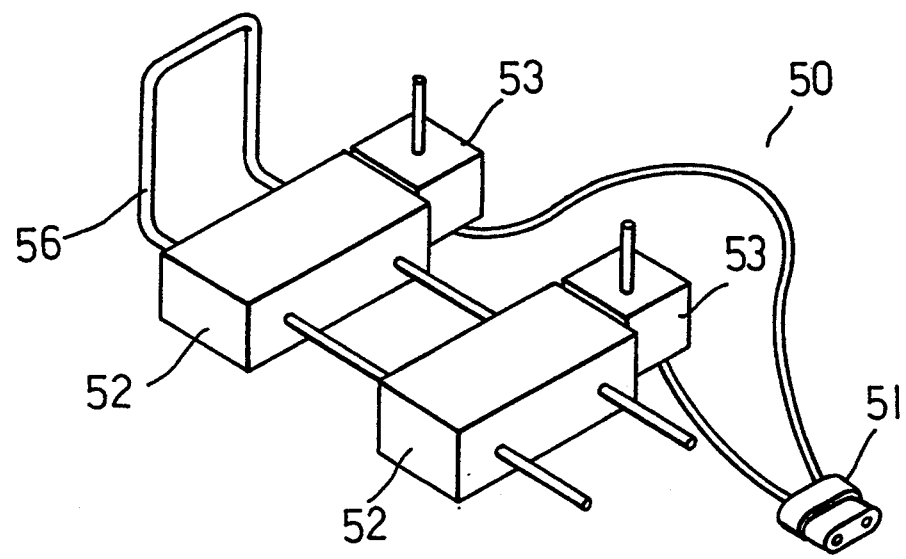
FIG. 10 is a diagram showing the slidable mounting of the charging means to a fixing bracket.

Referring further to FIG. 10, the two probe pin plugs 52 can be slidably mounted to a bracket 56, facilitating the slidable adjustment of the same in practical operation. Thus the probe pins 54 of the probe pin plug 52 can be easily engaged with the pin holes of the battery.

I claim:

1. A universal battery pack charger adapted for rechargeable battery packs of different type, comprising:
   a charger case;
   a receiving cavity disposed on said charger case;

a battery pack mounting seat removably located within said receiving cavity;

a slidable abutment plate having a vertical abutment member disposed at one side thereof;

a locking means disposed under said abutment plate;

a slide passage disposed adjacent to said receiving cavity;

a restraint means disposed in said passage being in engagement with said locking means so as to selectively retain said abutment plate in place which is slidably moved in said slide passage;

an adjustment slide means movably associated with said battery pack mounting seat being vertically adjusted in its position;

a pair of sliding terminal seats horizontally slidably associated with said adjustment slide means being provided with a vertical and a horizontal probe pin thereon;

a recessed plug-in cavity disposed on said charger case;

2. A universal battery pack charger as claimed in claim 1 wherein a set of independent charging means having a pair of attachment blocks each of which is provided with a number of sockets thereon and can be randomly attached to the surface of a battery pack by way of magnet or sucking disks with ease so that a probe pin plug having a probe pin disposed thereon can selectively engaged with one of said sockets, permitting said probe pin to adaptedly engage with vertically or horizontally located insertion holes of different kinds of battery charger; and each said probe pin plug is electrically connected to a plug which is plugged into said recessed plug-in cavity of said charger case whereby any special battery packs can be charged accordingly.

3. A universal battery pack charger as claimed in claim 1 wherein said battery pack mounting seat is provided with a magnet or electrically operated magnet thereon so as to securedly retain a mounted battery pack in place.

4. A universal battery pack charger as claimed in claim 1 wherein said battery pack mounting seat is provided with a buckle belt for retaining a mounted battery pack in place.

5. A universal battery pack charger as claimed in claim 1 wherein said battery pack mounting seat is provided with a plurality of sucking disks disposed on the surface thereof for retaining a mounted battery pack in place.

6. A universal battery pack charger as claimed in claim 1 wherein said battery pack mounting seat is provided with a retaining means having a vertically adjustable spring biased holding unit and slidably mounted to a vertical adjusting trough disposed at one side of said mounting seat; and consecutive engagement teeth disposed on said retaining block can be in selective engagement with stop projections on said vertical adjusting trough for retaining said retaining block in place.

7. A universal battery pack charger as claimed in claim 1 wherein said receiving cavity of said charger case is provided with a downward extended through opening at the bottom thereof so as to permit of easy adjustment of the position of said probe pins of said sliding terminal seats from the underside of said charger case.

8. A universal battery pack charger as claimed in claim 1 wherein said receiving cavity is provided with a restraint groove at each side thereof so that said battery pack mounting seat having an engagement protrusion disposed at each side thereof in correspondence to said restraint groove whereby said mounting seat can be readily removed from said receiving cavity of said charger case for adjustment of said sliding terminal seats and then relocated in said receiving cavity.

9. A universal battery pack charger as claimed in claim 1 wherein said battery pack mounting seat is provided with a raised stop flange at one side thereof in proximity to one of said engagement protrusions and a guide track is disposed at one of the neighboring sides of said opposite sides of said engagement protrusions so that said slide member can be located thereon and vertically adjustable; and a mono-track projection is disposed on one side of said slide member on which said said terminal seats each having a retaining trough and a horizontal and a vertical probe pin disposed thereon can be slidably engaged with said mono-track projection.

10. A universal battery pack charger as claimed in claim 1 wherein said restraint means is comprised of a number of consecutively disposed tooth-like units and said locking means is a downward extended projection disposed under a one end free retaining piece and in selective engagement with one of said tooth-like units so as to help said abutment plate in place after the same is positioned at a proper place.

11. A universal battery pack charger as claimed in claim 9 wherein said slide member and said side of said battery pack mounting seat having a guide track defined thereat are provided with a through slot respectively thereon so as to permit electrical cords to be led therethrough.

12. A universal battery pack charger as claimed in claim 2 wherein said attachment blocks of said set of independent charging means are slidably mounted to a fixing bracket.

* * * * *